United States Patent [19]
Pohl et al.

[11] Patent Number: 4,892,274
[45] Date of Patent: Jan. 9, 1990

[54] SEGMENTIZED FLAP SYSTEM

[75] Inventors: Ulrich Pohl, Bremen; Juergen Renken, Freyersen, both of Fed. Rep. of Germany

[73] Assignee: MBB GMBH, Bremen, Fed. Rep. of Germany

[21] Appl. No.: 900,508

[22] Filed: Aug. 26, 1986

[30] Foreign Application Priority Data

Aug. 29, 1985 [DE] Fed. Rep. of Germany ....... 3530865

[51] Int. Cl.$^4$ ............................ B64C 9/06; B64C 9/16
[52] U.S. Cl. .................................... 244/213; 244/215; 244/216; 244/75 R
[58] Field of Search ............... 244/213, 214, 215, 216, 244/217, 218, 219, 75 R

[56] References Cited

U.S. PATENT DOCUMENTS

| | | | |
|---|---|---|---|
| 2,295,306 | 9/1942 | Tampier | 244/215 |
| 2,387,492 | 10/1945 | Blaylock et al. | 244/217 |
| 2,423,984 | 7/1947 | Knoll | 244/216 |
| 2,665,084 | 1/1954 | Feeney et al. | 244/217 |
| 2,696,954 | 12/1959 | Harmon et al. | 244/215 |
| 4,172,575 | 10/1979 | Cole | 244/216 |
| 4,180,222 | 12/1979 | Thornburg | 244/215 |
| 4,472,780 | 9/1984 | Chenoweth et al. | 244/194 |
| 4,614,320 | 9/1986 | Rutan | 244/218 |

*Primary Examiner*—Galen Barefoot
*Attorney, Agent, or Firm*—Ralf H. Siegemund

[57] ABSTRACT

A flap system along the trailing edge of a transonic aircraft wing which system includes segments arranged in span direction, a driving system for protraction and retraction of the segments includes a plurality of spindle drives connected to the segments such that each segment is connected to at least two spindle drives; are controlled the spindle drives in such a manner that at least some of the drives are independently controlled from each other so that the segments can pivot on vertical axes, in addition to a regular pivoting about respective horizontal axes.

5 Claims, 5 Drawing Sheets

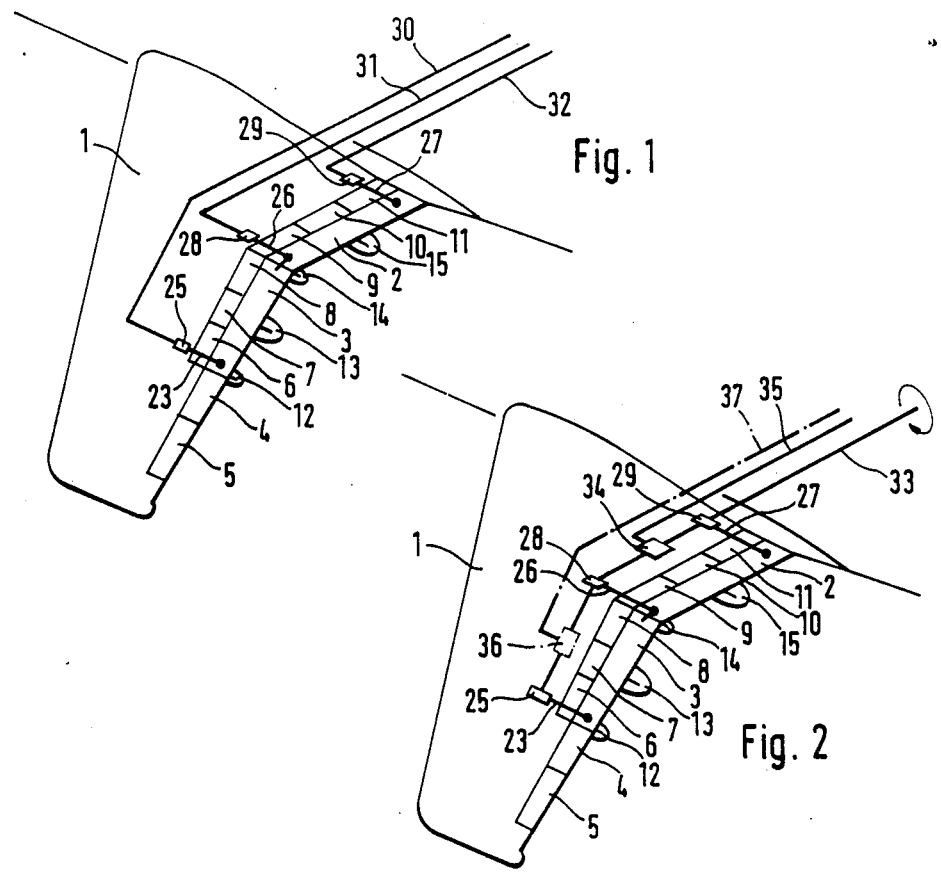
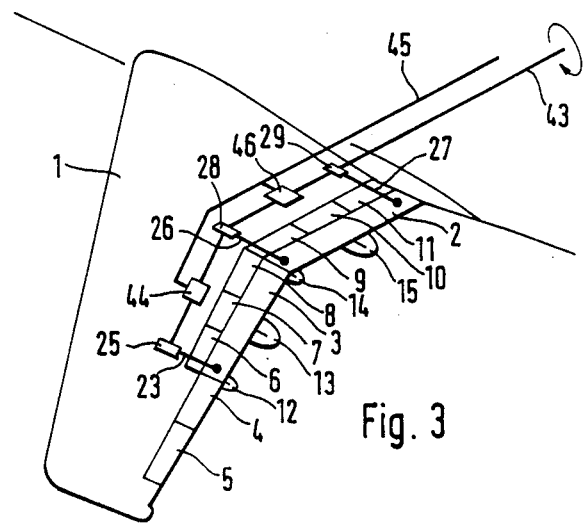

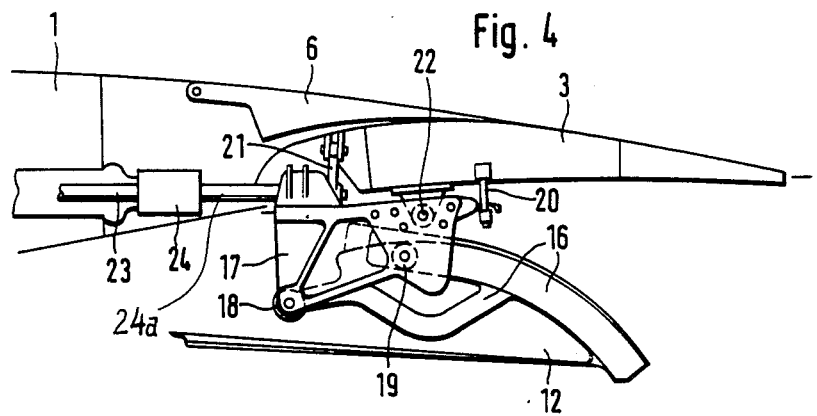
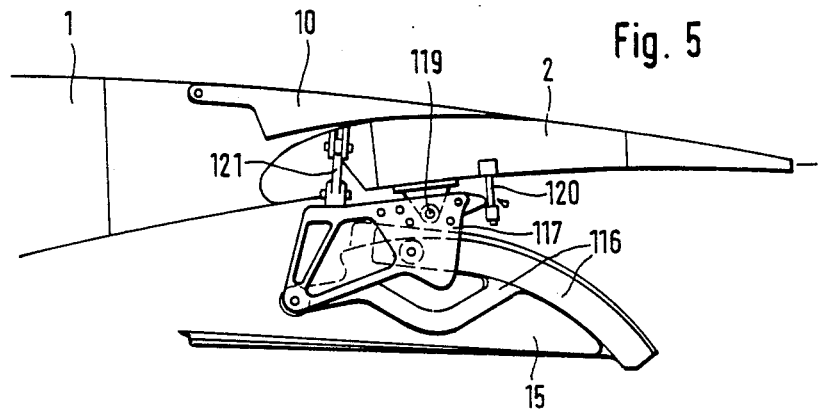

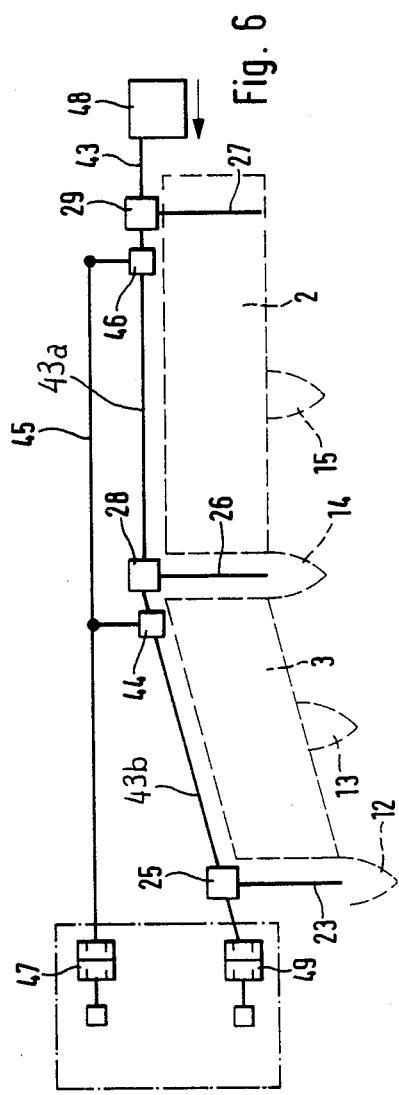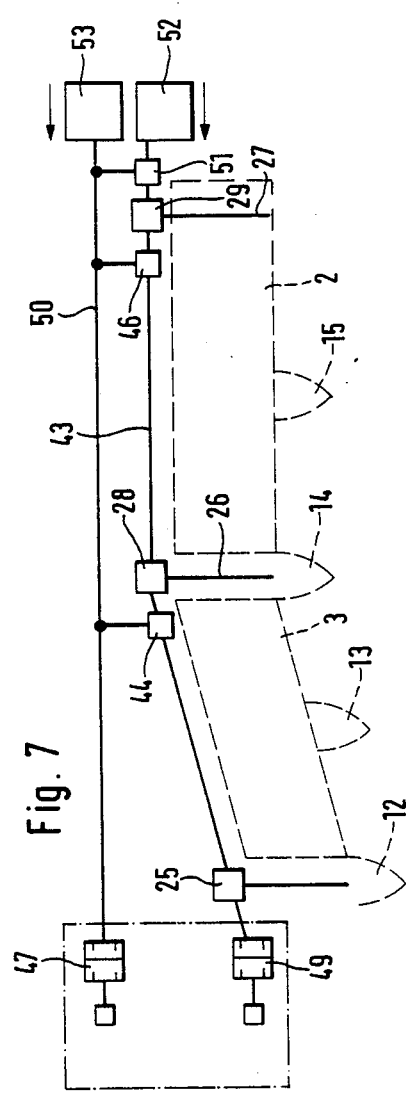

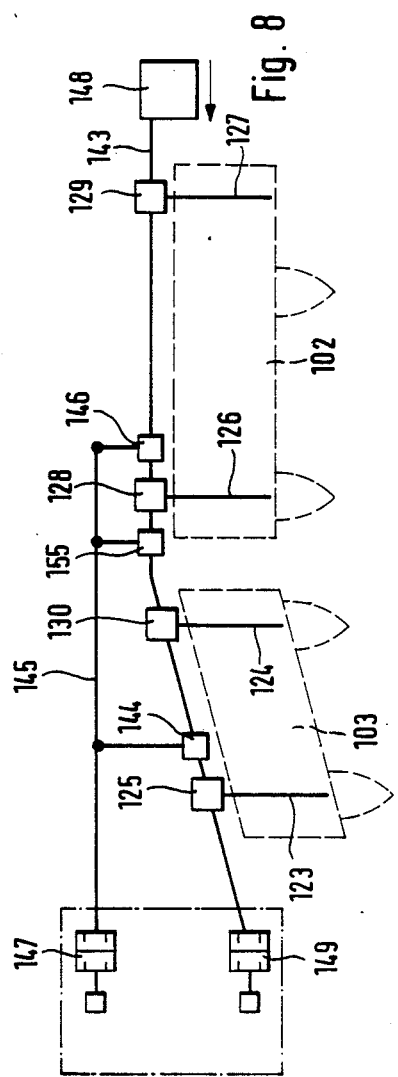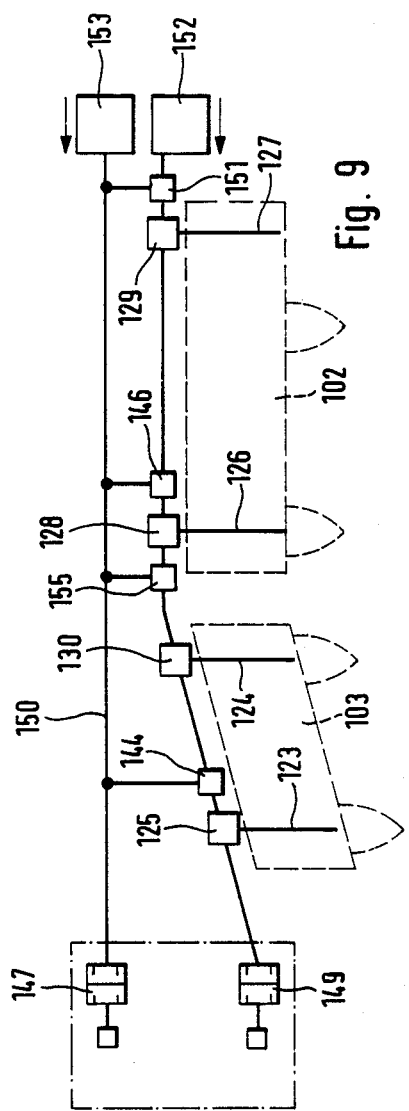

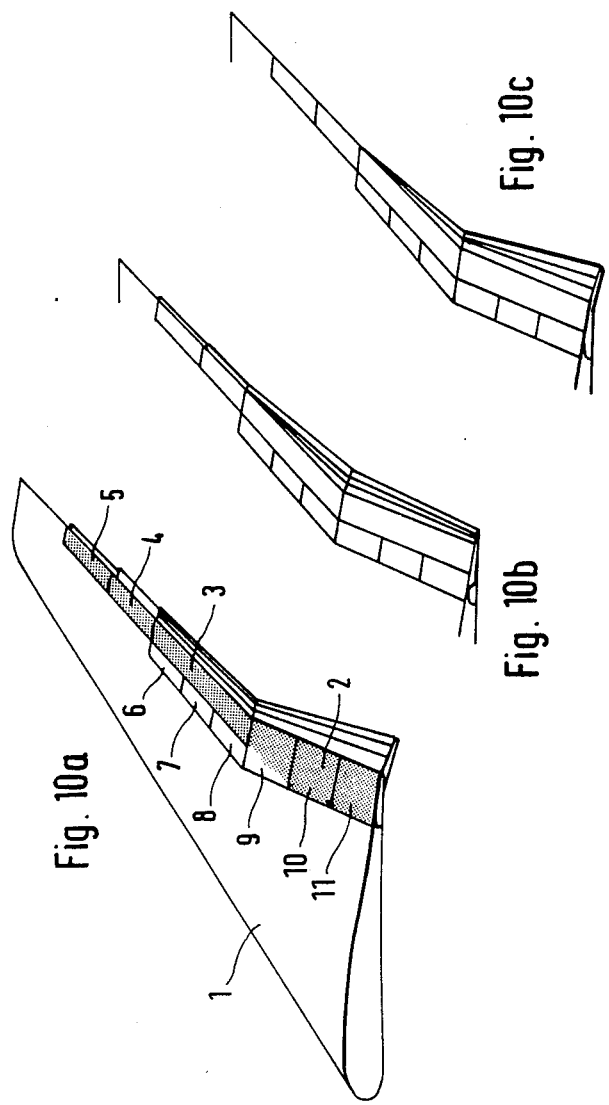

SEGMENTIZED FLAP SYSTEM

BACKGROUND OF THE INVENTION

The present invention relates to a drive and operating system for use in aircraft wings, for purposes of guiding and operating, i.e. protracting, retracting and pivoting a flap system, particularly a trailing edge flap system in a transonic wing of the type to be used in transport or other commercial aircraft or the like.

More particularly, the invention relates to such a drive and operating system for use in segmentized rear edge flaps, wherein each segment is to a limited extent "soft" as to torsion over its span widths, and is subject to individual control under utilization of a positive connection to a spindle drive. Moreover it is assumed that particular tracks, i.e. curved tracks, are provided so as to guide protraction and retraction of individual segments.

So-called rail kinematics for the controlled adjustment of flap systems in aircraft wings is a practice of long standing. Particularly, these rail kinematics, being a part of the drive and operating system referred to above, are used to protract or extend high lift flaps being arranged along the trailing edge of a wing, the production or extension to occur particularly during takeoff and landing, while these high lifts flaps are retracted during cruising, particularly in higher altitudes and at relatively high speeds. Moreover, these rail systems can be used to guide supplemental flaps, so-called flaperons, which are used for the conduction of maneuvers during flight.

In addition to these conventional uses of aircraft wing flaps, these flaps, and particularly trailing edge flaps, and in connection with the kinematics and mechanical structure controlling the movement and position as well as orientation of such flaps, German printed patent application 31 14 143 (see also U.S. patent application Ser. No. 366,250; filed: 04/02/1982) proposes to improve the aerodynamic effectiveness, particularly of transonic aircrafts during high speed/high altitude flights for purposes of changing and controlling the curvature of the camber line of a wing, in dependance upon current, updated parameters, such as altitude, weight, and speed, whereby also the effective area as well as the thickness of the wing can be modified in a controlled fashion under utilization of the existing flap systems and particularly during high speed/high altitude cruising, i.e. during those phases in which normally all flaps are well retracted. For realizing camber line curvature control, the known methods use flap systems which, for that purpose, are torsioned soft to a limited extent, i.e. they yield resiliently upon application of torsion.

DESCRIPTION OF THE INVENTION

It is an object of the present invention to improve drive and operating systems for trailing edge flaps in transonic wings so as to permit a wide range of camber line curvature changes as well as changes in the aerodynamically effective area, and particularly in such a manner that these changes may vary in span direction of the wing.

It is a particular object of the present invention, to provide a new and improved drive and operating system for a trailing edge flap system in aircraft wings, particularly a wing for transonic operation and as used in transport and commercial aircraft, whereby specifically the flap system is segmentized in span direction with separate control of the segments, and a limited degree of torsion softness in span direction as to each segment, whereby, moreover, a rail system is provided which determines the path segment traverses on protraction and retraction.

In accordance with the preferred embodiment of the present invention, it is suggested to use spindle drives for the various segments such that the protraction and retraction speed are independently adjustable at different points of a segment, spaced apart in span direction, and preferably under utilization of a separate control unit and/or action as to each spindle drive. The segments may be driven through spindle drives which, in turn, are driven in common by a common drive shaft, whereby, however, adjacent spindle drives are separated through controllable differential gear.

The invention offers the advantage that a wide spectrum of realizable camber line curvature variations as well as effective surface areal variations, as far as it effects on the profile and sections of the wings are concerned, are covered so as to cover, in turn, actual requirements of improving aerodynamic effectiveness during cruising in an optimizable fashion. This involves particularly difference in camber line curvature changes along the span of the wing as a whole, whereby, however, the various contour changes as provided and produced by the individual segments still maintain aerodynamic smoothness across the entire wing without effective surface discontinuities of and in the aerodynamically effective airfoil surface.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIGS. 1, 2, and 3 are schematic, isometric views of wings improved in accordance with the preferred embodiment of the invention for practicing the best mode thereof, in a variety of different drive and operating systems for the trailing edge flaps of a transonic wing.

FIGS. 4 and 5, respectively, illustrate details for driving and guiding a high lift flap;

FIGS. 6, 7, 8 and 9 illustrate various details of the particular example shown in FIG. 3 as well as deviations therefrom, towards two different versions; and FIG. 10 illustrates three exemplary cases for using the inventive drive and operating system for the rear edge flap systems in a transonic aircraft wing.

Proceeding now to the detailed description of the drawings, FIGS. 1, 2, and 3 illustrate in each instance the left-hand wing 1 of a transonic wing system for commercial or transport aircraft. The trailing edge of each wing is provided with a flap system and it is, of course, apparent that the respective right-hand wing has a symmetrical flap arrangement. Reference numerals 2, 3, 4, and 5 denote segments of that flap system, whereby the segments 2 and 3 are so-called high lift flaps which can be protracted in rearward direction as well as retracted. The segments 4 and 5 are so-called flaperons. In addition, the upper surface of the wing is provided with a plurality of so-called spoilers, 6, 7, 8, 9, 10, and 11. The trailing edge of each of the spoilers, when folded down, bears against the respectively (rearwardly) associated high lift flap which are, respectively, flaps 2 and 3. Moreover, FIGS. 1, 2, and 3 show pylons 12, 13, 14, and 15 in which the inventive drive and operating system including the respective guide rails, are provided. These rails will be described more fully below with reference to FIGS. 4 and 5.

Therefore, certain basic construction elements of the wing including the segments 2 through 5, the spoilers 6 through 11, the pylons 12 through 15, are (in principle) is the same in all three instances of the FIGS. 1, 2, and 3. However, these figures show different examples of realizing the inventive drive and operating system, particularly the drive system for the flap segments. In order to elucidate still further similarities, we turn briefly to FIG. 4 which illustrates details that are also the same for these various examples, but in relation thereto the differences can be demonstrated more clearly.

The detail shown in FIG. 4 is a section view through any trailing edge portion of the wing shown, e.g. in FIG. 1 (or 2 or 3), including particularly a pylon structure 12 and further including the high lift flap 3, there are, of course, high lift flap 2 and 4, arranged in relation to both sides the flap 3 (above and below the plane of the drawing of FIG. 4) and as can also be seen from FIGS. 1 through 3. The high lift flap 3 is acted upon and cooperates with an inventive drive and operating systems which, in this case, includes a bi-parted, curved rail 16 which supports and in which runs a supporting and mounting structure 17 for the high lift flap 3, under utilization of guide rollers 18 and 19 journaled on structure 17. The high lift flap 3 is movably held by and connected to the support device 17 by means of two coupling rods, 20 and 21, and by a pivot hinge 22. A spindle rod, i.e. a threaded rod 23, is provided as immediate drive for the support structure 17 to thereby drive and move the high lift flap 3. As the rod 23 moves axially it turns in a sleeve 24 being connected to the support structure by a rod 24a.

Spindle rod 23, as can be seen in FIGS. 1, 2, and 3, is driven by a spindle drive gear 25. The same is true for two other spindle rods 26 and 27 which are also shown in FIGS. 1, 2, and 3, and which are, respectively, driven by spindle drive gears 28 and 29. In accordance with the invention the drive system for the spindle drive gears 25, 28, and 29 are constructed so that the protraction-retraction speed for the rods, as provided by the individual spindle drives, are controllable independently from each other. In other words each gear 25, 28 and 29 drives its respective rod at its own speed which may be similar to each other or different.

In the case of FIG. 1, the example shown therein provides that each of the spindle drive gears 25, 28, and 29 are associated and operatively connected with separate controllable drive shafts or transmission 30, 31 and 32 respectively. These individual units, to the extent they are not shown, are included in the fuselage. In each instance these drive shafts or transmissions 30, 31 and 32, e.g. hydraulic power transmission devices are drivingly connected to a non-illustrated power control unit or PCU.

The example shown in FIG. 2 differs from the example shown in FIG. 1, in that the spindle drive gears 25, 28, and 29 are, in this case, acted upon by a common drive shaft 33. This drive shaft 33, in turn, is driven by a single power control unit, likewise not shown but mounted in the fuselage. However, in furtherance of the invention, the individual drives 25, 28, and 29 are to provide different and differently modifiable and controllable protraction-retraction speeds. Thus, between at least two adjacent spindle drives, such as 28 and 29, a separately controllable differential gear 34 is interposed. This differential gear can be controlled through a rotational control path 35, and thereby make sure that, in fact, the two spindle drives will provide their output speeds independent from each other. As indicated further in FIG. 2, one may preferably use another, likewise individually controllable differential gear 36 being interposed between the two spindle drives 25 and 28. The second differential gear 36 is controllable via a second control path 37. This then completes the concept that in between two respective adjacent spindle drives there is provided a controllable differential gear on the drive shaft 33.

The example shown in FIG. 3 differs from the two examples as described thus far by a common drive shaft 43 carrying two differential gears 44 and 46, which, however, are controlled by a common control path 45. Hence, there is a simplifying dependency in the various spindle speeds.

FIGS. 6 and 7 show in detail and in two different versions, how to control the differential gears 44 and 46 as per FIG. 3 while still maintaining the concept of independence of the drives 25, 28, and 29 that are being controlled. In the case of FIG. 6, the common control path 45 is realized by means of a shaft, which is subject to breaking, having an asymmetry unit 47 provided to act as a brake and exerting, therefore, braking forces upon this shaft. The figure shows furthermore that the drive shaft 43 is controlled by a power control unit 48. Shaft portions 43a and 43b continue the drive shaft dynamically beyond the differential gears and the end of this shaft train is likewise connected to a similar brake device 49. Selective and controlled braking at 47 and 49 modifies the speeds of gears 25, 28 individually and as compared with the drive shaft 43 imparts directly on gear 29.

FIG. 7 differs from FIG. 6 in basically two ways. First a further differential gear 51 is provided which is arranged between the power control unit 52 and the first in line of spindle drives, being spindle drive 29, and , thus, being also included in the drive shaft 43. Secondly, a control shaft 50 is provided here in lieu of shaft 45 for the three differential gears 44, 46, and 51, which, in this case, includes not only the asymmetric brake unit 47, but also an auxiliary control unit APCU 53 which acts directly upon the control shaft 50. These two modifications expand the ranges of variability by means of which the speeds of spindles 23, 26, 27 may differ.

In all these arrangements as described thus far, it is provided that two adjacent high lift flaps, such as 2 and 3, are at their respective adjacent ends controlled for protraction and retraction by one and the same spindle drive, which is spindle drive 28, in each of these instances of FIG. 6 and 7. This is not a materially constraining limitation but simply ensures that in span direction the contours of the adjacent flap segments (2 and 3) merge smoothly.

In FIGS. 8 and 9, however, two different arrangements are shown wherein in each instance the adjacent ends of high lift flaps such as 102 and 103 are controlled by separate spindle drives, which are 130 and 128; their speed is independently controllable. One can see here that there are altogether four spindle rods 123, 124, 126 and 127 for respectively acting in pairs upon the flaps 102 and 103 as illustrated. Also, differential gears are provided, 144, 146, and 155, to be interposed in between respective two adjacent spindle drives. A common control shaft 145 acts on all these differential gears while being acted upon by an asymmetry brake unit 147. A power control unit, 148 drives a train of shafts, 143 and an asymmetric-brake unit 149 acts on the other end of the shaft train 143. All these elements are provided otherwise to serve the same purpose described already above with reference to FIG. 6.

The device shown in FIG. 9 shows analogously to the device shown in FIG. 7, an additional differential gear 151 and an auxiliary control unit 153, likewise being connected to the shaft 150.

Having described the layout in general, the devices as illustrated function as follows. First of all, it should be noted that the inventive drive and operating units, operating and driving the supports 17, such as shown in FIG. 4, may include passive, i.e. non-driven supports, such as 117 which is shown in FIG. 5. Such a supplemental non-driven support 117 is, for example, enclosed, as indicated by pylon 15 in FIGS. 1, 2, and 3. In this case a supplemental support 117 for a flap segment is provided for moving passively on a bi-parted guide rail 116 and carries e.g. the high lift flap 2 by means of coupling rods 120 and 121 and being further connected for swiveling by means of a pivot hinge 122. The supplemental device, therefore, is provided merely for purposes of guidance and balancing and does not directly participate in the driving, i.e. the impartation of protraction and retraction motion upon the high lift flap 2.

In all these various examples, as illustrating particularly the inventive flap segment drive and operating system, one obtains different speeds of protraction and retraction for the individual support of the flaps (i.e. flap segments) which support and carry the flap segments but owing to the different speeds, one obtains in span direction different degrees of protraction and retraction of flap segments and flap portions, equivalent to a pivot motion imparted upon the respective flap segment on a vertical axis. In addition, the continuation of the surface contour is ensured through proper selection of the respective speeds.

Turning specifically now to the operation of the device shown in FIG. 1, variation among the flap segments with regard to protraction, retraction, pivoting, the variation to occur in span direction, obtains in that each spindle drive is separately driven via input shaft 30,31,32 which in turn are driven, for example, through an electric or hydraulic drives, and these separate drives are, in turn, individually and separately controlled so that all of these three spindle drives can be operated independently from each other particularly as far as speed selection is concerned. Of course, the term "independently" must not be understood in terms of random selection. There is, of course, a relationship in the speed given simply by the mechanical constraints of the device as a whole and specifically by the desire to maintain overall surface contour smoothness. Independently, therefore, simply means non-equally but with specific precalculated or predetermined differences in speed towards obtaining a definite pivotal deflection of the flap segments along vertical axes.

The device shown in FIG. 2 obtains the same effect in that shaft 33 drives the three spindle drive gears 25, 28, and 29 in unison to thereby obtain, without further measures a particular similar protraction and retraction speed for each flap segment end. However, the two differential gears 34 and 36 are separately controlled to impart differentiating movement upon the various spindle drives to obtain the aforementioned differences. Therefore, in this case, there will be a first control unit which controls the rotation of the shaft 33 and two additional controllers control the control path 35 and 37 such that the requisite differentiation in the spindle drive rotation obtains. Alternatively, this supplemental control of the differential gear can be carried out through an asymmetry and breaking unit.

Analogously, the wing arrangement shown in FIG. 3 also having a plurality of differential gears, may be controlled through asymmetry and breaking unit or auxiliary control units, effecting the shaft 45 as was described with reference. Speed differentiations in addition obtain here through design of the differential gears and/or the spindle drive gears. This, of course, leads to a somewhat lesser degree of freedom concerning variation and is, therefore, to be seen as a simplified version. As staggered approach in this regard was explained above with reference to FIG. 6 and 7 (or 8 and 9) one has to observe, however, that the number and kinds of actual variations particularly as far as the control of the various flap segments are concerned, is limited bearing in mind, for example, that for purposes of camber line curvature control the weight of the craft progressively decreases and will for example never increase during cruising. Also, the flight programs follow a certain uniform pattern with regard to speed and additionally, so will the camber line curvature variations.

Up to this point, only the high lift flaps have been considered, but reference is now made to the more outwardly arranged flaperons 4 and 5. They can be controlled in principle in the same manner, and even though their function is different, under normal operations they can also be included as wing contour varying elements cooperating with the high lift flaps. This then leads broadly to situations as shown by way of example in FIG. 10a, b, and c. Certain variations and the scope of the variability concerning variations in the wing profile and span direction can be explained to be applicable particularly during cruising. The figures show a particular transonic wing having adjusting structure of the type as explained thus far. The dots in the figure indicate that portion of the flap structure that can be used for varying the camber line curvature and the wing section and profile during cruising. The various flap segments are shown in different states of protraction with variation in span direction.

FIGS. 10a, 10b, and 10c differ in the form of combinations with various segments 2 through 5 may assume as far as positions are concerned based on differences in spindle drive advance. The numbers written next to the various positions indicate the angle of pivoting of the respective segment for the different situations depicted in the figures, and include particularly information how far a respective device was protracted in rearward direction with respect to a completely retracted position. The FIGS. 10b and 10c, particularly, depict two extreme dispositions of contour adaptations. As can be seen by comparing these two figures, the inventive system offers a considerable spectrum in variability concerning profile changes of the wing, whereby, however, in each instance an aerodynamic smooth condition obtains between adjacent segments.

Finally, it should be mentioned that the figures are to be understood by way of example only, and particularly the number of segments that can be operated in accordance with the principles of this invention, is not restricted to four, but any practical and structurally, as well as constructionally feasable arrangement can be realized, if that is of advantage in any particular instance.

The invention is not limited to the embodiments described above, but all changes and modifications thereof, not constituting departures from the spirit and scope of the invention are intended to be included.

We claim:

1. A flap system for transonic aircraft wings which system includes flap segments arranged in span direction, a driving system for protraction and retraction of the flap segments, comprising:
   a plurality of spindle drives connected to said flap segments such that each flap segment is connected to at least two spindle drives; and
   control means for controlling said spindle drives in such a manner that at least some of the drives are independently controlled from each other, such that those of the spindle drives that are connected to the same flap segment, are controlled independently from each other to obtain pivoting of that same flap segment on a vertical axis.

2. The system as in claim 1, wherein each spindle drive is separately and individually controlled.

3. The system as in claim 1, including for at least two of the spindle drives, acting upon the same flap segment, a common controlled drive input, there being a differential gear interposed between the latter two spindle drives, there being means for separately controlling the differential gear.

4. The system as in claim 1, the flap segments being arranged along the trailing edge.

5. A flap system for transonic aircraft wings which includes segments arranged in the span direction, and including means for protraction and retraction of the segments as well as pivoting on horizontal axes, the improvement of a plurality of independent means coupled to and acting on respective opposite ends of the segments for thereby pivoting the segments additionally about different vertical axes, independently from any protraction and retraction of any of the segments as a whole.

* * * * *